(12) United States Patent
Slotznick

(10) Patent No.: US 8,130,200 B2
(45) Date of Patent: Mar. 6, 2012

(54) COMBINATION THUMB KEYBOARD AND MOUSE

(76) Inventor: Benjamin Slotznick, Mt. Gretna, PA (US)

( * ) Notice: Subject to any disclaimer, the term of this patent is extended or adjusted under 35 U.S.C. 154(b) by 499 days.

(21) Appl. No.: 12/353,729

(22) Filed: Jan. 14, 2009

(65) Prior Publication Data

US 2009/0179869 A1 Jul. 16, 2009

Related U.S. Application Data

(60) Provisional application No. 61/020,862, filed on Jan. 14, 2008.

(51) Int. Cl.
*G06F 3/02* (2006.01)
(52) U.S. Cl. ......................................... 345/169; 345/163
(58) Field of Classification Search ........................ None
See application file for complete search history.

(56) References Cited

U.S. PATENT DOCUMENTS

| | | | | |
|---|---|---|---|---|
| 5,949,401 A * | 9/1999 | Kazarian | ...................... | 345/156 |
| 7,058,356 B2 | 6/2006 | Slotznick | | |
| 2002/0135564 A1 | 9/2002 | Abe | | |
| 2003/0090394 A1 | 5/2003 | Zagnoev | | |
| 2003/0141991 A1 | 7/2003 | Honnavalli | | |
| 2004/0012561 A1 | 1/2004 | Zngf | | |
| 2005/0078087 A1* | 4/2005 | Gates et al. | ................... | 345/163 |
| 2006/0080710 A1* | 4/2006 | Carthern | ......................... | 725/47 |
| 2006/0109239 A1* | 5/2006 | Hsiung | ........................ | 345/156 |
| 2006/0232557 A1 | 10/2006 | Fallot-Burghardt | | |
| 2007/0120824 A1* | 5/2007 | Machida | ...................... | 345/157 |
| 2007/0132733 A1* | 6/2007 | Ram | ............................ | 345/163 |

(Continued)

OTHER PUBLICATIONS

Wikipedia entry for "Thumb Keyboard." Printout from website: http://en.wikipedia.org/w/index.php?title=Thumb_Keyboard&printable=yes, printout date: Jan. 6, 2009, 1 page.

(Continued)

*Primary Examiner* — Lixi C Simpson
(74) *Attorney, Agent, or Firm* — Panitch Schwarze Belisario & Nadel LLP

(57) ABSTRACT

A user interface device for use in controlling one or more external devices has at least a positional change operation mode and a keyboard operation mode. The user interface device has a main body portion, an orientation sensor, a surface sensor, a processor and a switch. The main body portion includes a top surface having at least one button that is active only in the positional change operation mode. The at least one button triggers an action in the one or more external devices when pressed. The bottom surface has a displacement sensor and a thumb keyboard. The displacement sensor detects positional change of the user interface device only during the positional change operation mode. The positional change is used for navigation on a display screen of the one or more external devices. The thumb keyboard has a plurality of keys that generate keyboard signals for sending to the one or more external devices only when the user interface device is in the keyboard operation mode. The plurality of keys allow for entry of at least alphabetic characters. The orientation sensor detects the orientation state of the user interface device. The surface sensor detects whether the bottom surface of the user interface device is touching an external surface. The processor includes processor logic that receives input signals from at least the orientation sensor and the surface sensor, and uses the input signals to determine whether to place the user interface device in either the positional change operation mode or the keyboard operation mode. The switch is configured to place the user interface device in either the positional change operation mode or the keyboard operation mode.

29 Claims, 12 Drawing Sheets

U.S. PATENT DOCUMENTS

| | | | | |
|---|---|---|---|---|
| 2007/0188472 A1* | 8/2007 | Ghassabian | .................. | 345/169 |
| 2007/0216648 A1* | 9/2007 | Lo et al. | ........................ | 345/163 |
| 2008/0030470 A1* | 2/2008 | Rensberger et al. | .......... | 345/163 |
| 2008/0122788 A1* | 5/2008 | Sirtori | ............................ | 345/158 |
| 2008/0174553 A1* | 7/2008 | Trust | ............................. | 345/163 |
| 2008/0316177 A1* | 12/2008 | Tseng | ............................ | 345/168 |
| 2009/0002320 A1 | 1/2009 | Karmazyn | | |

OTHER PUBLICATIONS

Edward Clarkson, E. et al., "An Empirical Study of Typing Rates on mini-QWERTY Keyboards," Georgia Institute of Technology, Conference on Human Factors in Computing Systems, CHI 2005, Apr. 2-7, 2005, Portland, Oregon, USA, pp. 1288-1291 of Proceedings, 4 pages.

Marshall Brain et al. "How Computer Mice Work", printout from website: http://computer.howstuffworks.com/mouse2.htm, printout date: Feb. 17, 2009, original posting date: unknown, 5 pages.

Marshall Brain et al. "How Computer Mice Work", printout from website: http://computer.howstuffworks.com/mouse4.htm, printout date: Feb. 17, 2009, original posting date: unknown, 18 pages.

Marshall Brain et al. "How Computer Mice Work", printout from website: http://computer.howstuffworks.com/mouse9.htm, printout date: Feb. 17, 2009, original posting date: unknown, 5 pages.

LG Mobile Phones, LG VX-8700, printout from website: http://www.lgmobilephones.com/phone.aspx?id=308, printout date: Feb. 17, 2009, phone released in 2007, 8 pages.

* cited by examiner

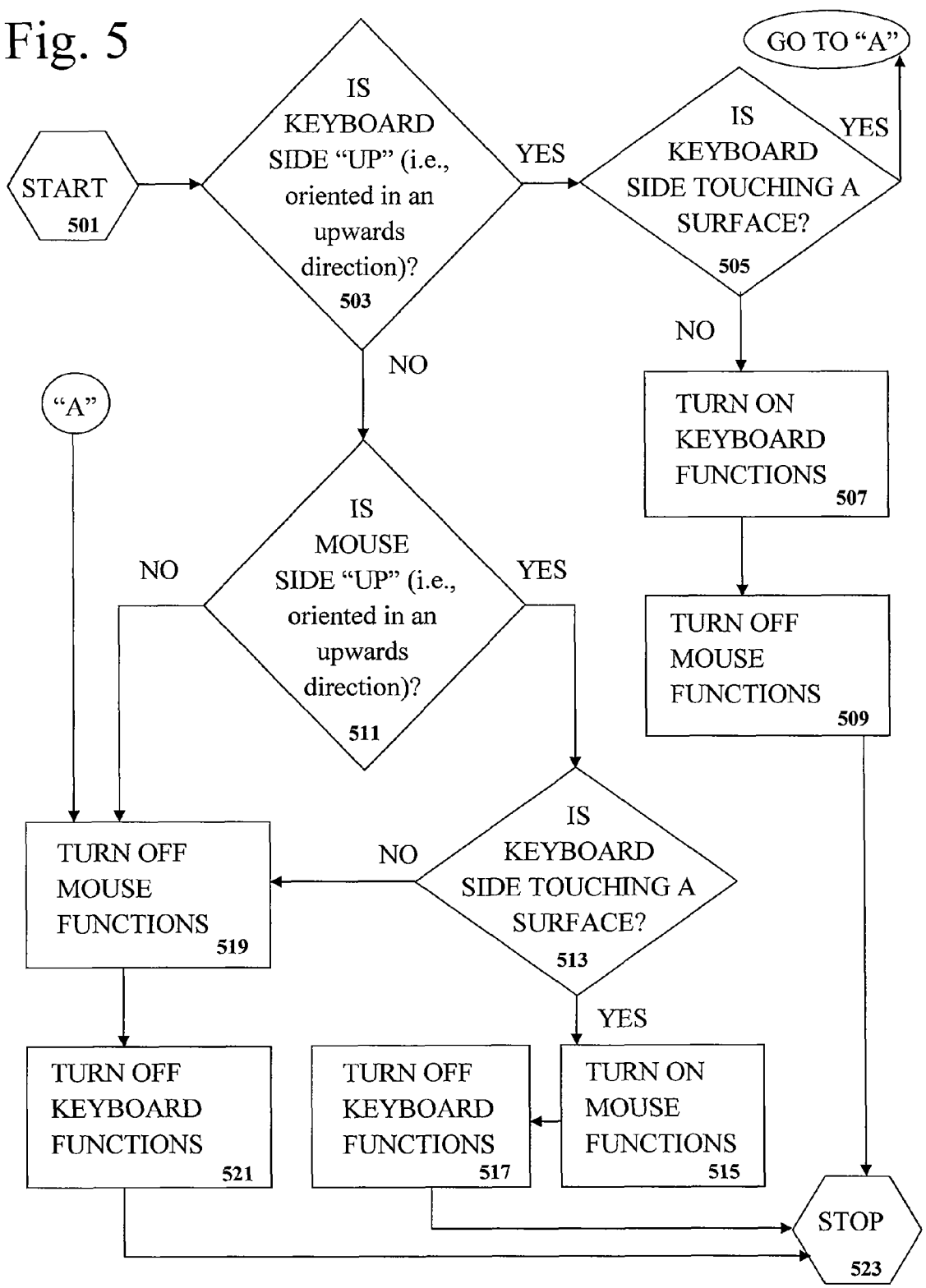

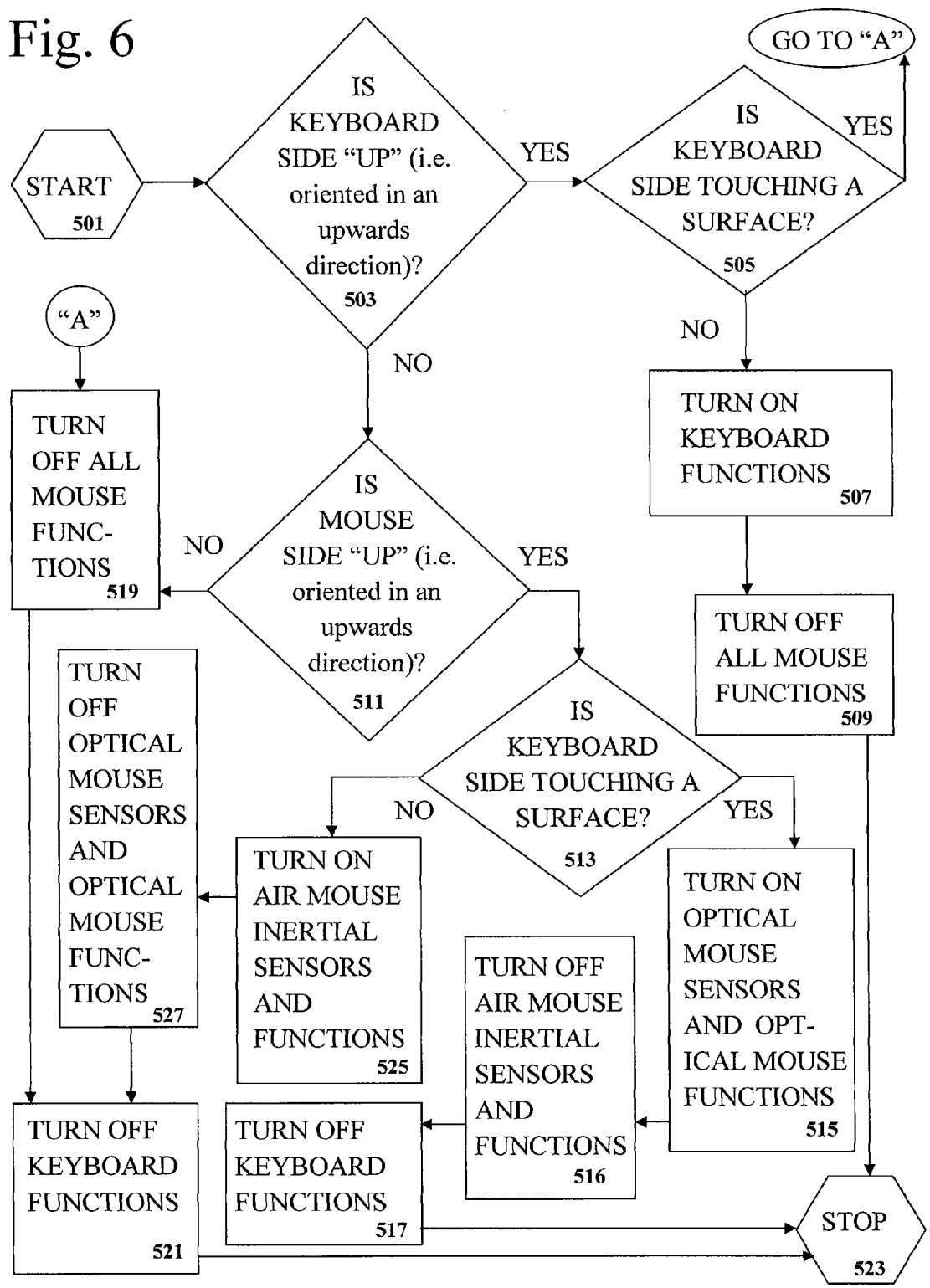

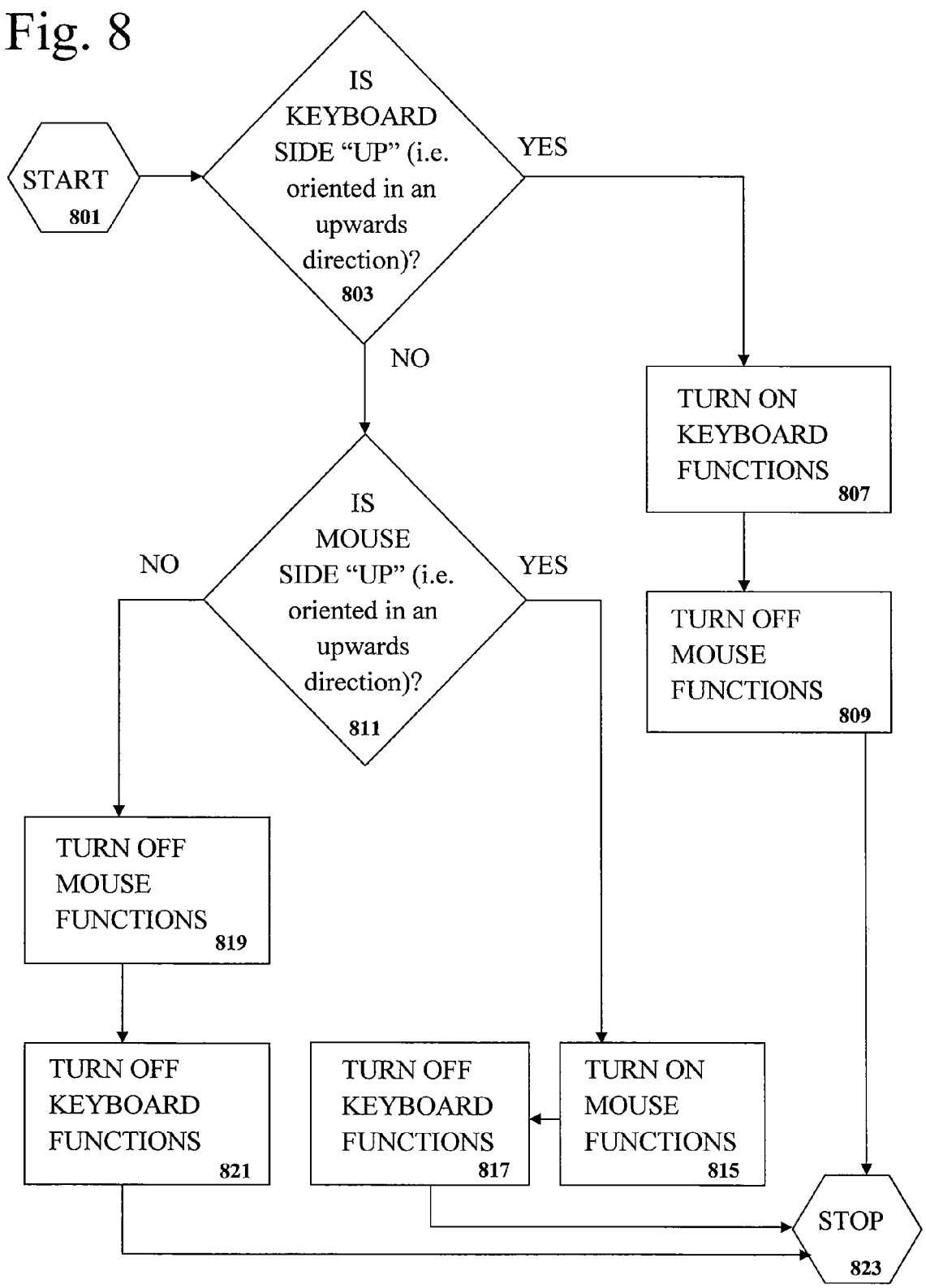

COMBINATION THUMB KEYBOARD AND MOUSE

CROSS-REFERENCE TO RELATED APPLICATIONS

This application claims the benefit of U.S. Provisional Application No. 61/020,862 filed Jan. 14, 2008.

BACKGROUND OF THE INVENTION

The traditional QWERTY keyboard and computer mouse have remained the most preferred input devices for personal computers—especially in combination. Yet in many circumstances, there is just not enough physical workspace to use them both. As an example, most laptop computers do not rely upon computer mice, but rather come with integrated touchpads or miniature joysticks as pointing devices. As another example, miniature keyboards designed to be operated by two thumbs (rather than ten fingers) have been incorporated in a number of mobile devices. These thumb keyboards are often called "thumbboards." The present invention integrates a thumb-operated alphanumeric keyboard and a mouse in a novel way to overcome workspace limitations.

It is well known that one of the fastest ways to enter text into a computer is for a skilled touch-typist to use a standard sized keyboard such as a QWERTY keyboard. (This is many times faster than hand-writing or hand-printing.) Optimal use requires the typist to be able to use all 10 fingers. Using one or two fingers to "hunt-and-peck" may cut speed and accuracy by half or more. As the keyboard gets smaller, both speed and accuracy decrease. Small reductions in key size and spacing may have only a minor effect, but at some point, the typist can no longer effectively use all ten fingers and may be reduced to "hunt-and-peck" typing.

Much smaller QWERTY keyboards have been found effective, especially for composing email, if they can be held in the user's two hands and operated by the user's two thumbs. Such keyboards have been incorporated into the Research in Motion (RIM) Blackberry® device and the Palm® Treo™ Smart Phone. These look like the standard "candy bar" style cell phone, but are significantly wider to accommodate the mini-QWERTY keyboard.

Many people find that Blackberry-sized smart phones are just too large for comfortable use as a phone. For this reason, many business people carry both a BlackBerry for email and a much smaller cell phone for voice calls.

Smaller keypads, such as that of a standard phone keypad, which have more than one letter per key, require either multiple keystrokes per letter, or word prediction software. Many users have found this fast enough and accurate enough for short text messaging know as "SMS," but many find that phone pad text entry is not accurate enough or fast enough for business email correspondence. For a laboratory comparison of text entry on mini-QWERTY keyboards versus other methods, see "An Empirical Study of Typing Rates on mini-QWERTY Keyboards, by Clarkson, Clawson, Lyons and Stamer (Georgia Institute of Technology) at http://www-static.cc.gatech.edu/fac/Thad.Starner/p/030_10_MTE/mini-qwerty-chi05.pdf.

Some cell phones try to include a mini-QWERTY keyboard without increasing their width by folding or sliding the keyboard into the phone, which often makes them thicker than typical cell phones. Examples include the UTStarcom XV6800, the LG Voyager VX10000, and the Danger/T-Mobile® Sidekick®.

It is well known in the art of computer peripheral devices how to construct computer input devices that communicate wirelessly with the computer. Prior art includes computer mice that communicate with a computer wirelessly. They communicate via RF, infrared, Bluetooth® or otherwise. They communicate wirelessly with hardware (such as Bluetooth) built into the computer, or they are sold with a separate wireless receiver (or transceiver) for the computer that plugs into the computer's USB port or slides into a PC card holder. For example, the Microsoft Standard Wireless Mouse uses the RF standard and requires a separate RF transceiver that plugs into the computer, the Microsoft Wireless Laser Mouse 8000 uses the Bluetooth standard but the manufacturer suggests that best results are obtained when using the Microsoft Mini Bluetooth Transceiver, while the Microsoft Wireless Bluetooth Mouse 5000 is designed to forgo a transceiver for computers with built in Bluetooth technology. Some mice (such as the Kensington Si650m Wireless Notebook Optical Mouse) have the USB receiver miniaturized so that it can be stored in a compartment inside the mouse when the mouse is not in use.

There are also keyboards which communicate with a computer wirelessly. They communicate via RF, infrared, Bluetooth or otherwise. For example, the Kensington Wireless PilotBoard Desktop keyboard uses RF technology, while the wireless Logitech diNovo Edge keyboard uses Bluetooth.

It is well known in the art how to construct computer mice to sense positional change. Computer mice sense positional change in a number of ways. Some have a roller ball on the bottom (bottom surface) that maintains contact with the external surface over which the mouse moves. The mouse then senses the movement of that roller ball. These mice usually need a flat clean surface on which to operate. (See "How Computer Mice Work," by Marshall Brain and Carmen Carmack at http://computer.howstuffworks.com/mouse2.htm.)

In contrast, optical mice have a light source (laser or other) on the bottom of the mouse which beams light on the surface over which the mouse moves. The first optical mice required that the mouse was used on a special surface with marked grid lines. The mouse then senses when the reflection of the light was interrupted by these lines and uses that information to sense change in position. More recently, optical mice use an imaging device (similar to the chip in a digital camera) to take many pictures per second of the surface over which the mouse moves. Internal software then compares each picture to the previous one and calculates the change in position. These mice do not need a perfectly flat surface, but do need a visual "texture" that the mouse can sense. (See "How Computer Mice Work," by Marshall Brain and Carmen Carmack at http://computer.howstuffworks.com/mouse4.htm for a discussion of both types of optical mice.) Many optical mice use a small light-emitting diode (LED) as the light source, while others used a laser-based light source that can be used on a greater range of surfaces.

Some mice use an inertial system to sense a change in position. These do not need to move over a flat surface—or any surface. They can be moved in the air and the inertial system will sense the change of position. Examples include the Gyration GO 2.4 GHz Optical Air Mouse and the Logitech MX Air Cordless Air Mouse. (See discussion of Motion-Based Mice in "How Computer Mice Work," by Marshall Brain and Carmen Carmack at: http://computer.howstuffworks.com/mouse9.htm with explanation of how Gyration uses miniature gyroscopes to sense position.)

It is well known how to construct a device that senses its orientation in three-dimensional space. That is, sensors know whether the device is "up" or "down" in its orientation to the horizontal and vertical axes. Such sensors are sometimes called inclinometers, clinometers or tilt sensors. More recently miniaturized microelectromechanical devices (also called "mems") using semiconductor technology have been used to create tiny inertial sensors and accelerometers, which can measure motion in three dimensions and detect gravity. Such sensors are used in game controllers like the Nintendo® Wii®. They are also used in the Apple® iPhone to keep the image displayed on the screen right-side up. As the iPhone screen is rotated 90 degrees from portrait to landscape mode, the sensor tells the phone software the orientation of the screen, and the phone software uses this information to decide how to display the image on the screen.

The Gyration Air Mouse actually houses two ways to sense positional change. When placed on a flat surface, it has a light source and optical sensor and acts as an optical mouse. When the Gyration Air Mouse is lifted off the surface and held in the air, it uses its inertial sensors to sense positional change. To prevent confusion between the two types of positional sensors (optical and inertial) the Gyration Air Mouse employs two features. It has a second light source on its "bottom" with an optical sensor, the sole purpose of which is to determine if the bottom of the mouse is on a surface. When the bottom is not on or near a surface, the first light source is turned off, so no positional information is obtained by the optical sensors. In addition, it has a trigger-like button on its bottom that has to be pressed for the inertial sensors to transmit positional change information to the computer.

In the Gyration Air Mouse, the second light source is used as a proximity detector (is the base of the mouse near a surface). It is well known how to construct other types of proximity detectors based upon touch, pressure, heat, or disruption of electromagnetic field. The Apple iPhone uses a proximity detector to sense when the iPhone is held next to the user's ear, in which case the screen is turned off to conserve power.

The iPhone also uses an ambient light sensor to automatically adjust the display brightness to the appropriate level. This saves power and improves the user experience.

The Kensington SlimBlade Media Mouse also has buttons on its bottom. The SlimBlade Media Mouse includes on the bottom of the mouse, a five function navigation pad for controlling multi-media functions of the computer. The functions are volume up, volume down, back, forward, and play/pause. The mouse communicates with the computer by a small USB transceiver. When not in use the USB transceiver fits into a compartment inside the mouse, and placing the transceiver in the compartment turns off the mouse to conserve its batteries. However, when the navigational pad is facing "up", squeezing one of the mouse buttons on the other side (now on the "bottom"), still activates that function, and moving one's finger over the mouse optical sensor (position on the same side as the navigation pad) will move the computer cursor. In other words, the mouse itself does not appear to determine which side of the device is "up" or control which sensors (top or bottom) transmit information to the computer.

BRIEF SUMMARY OF THE INVENTION

The present invention incorporates a thumb operated alphanumeric keyboard (such as a one with a QWERTY layout) on the bottom of a mouse—and will be referred to herein as a "Thumbboard-Mouse." In one preferred embodiment, the Thumbboard-Mouse communicates wirelessly with a personal computer or computing device, a network, or other peripheral devices. (A wired and tethered version is also an embodiment.) When used as a mouse (referred to herein as "mouse mode"), the Thumbboard-Mouse is held by one hand and works like any computer mouse, with a positional sensing element and one, two or more buttons on the top. Like other computer mice, some embodiments have an optional scroll button or mini track ball on the top between the buttons. In mouse mode position, the keyboard is on the underside of the device. The Thumbboard-Mouse (as detailed below) is designed so that when used as a pointing device, mouse operation is not hindered by the keyboard, and mouse operation will not inadvertently trigger text entry on the keyboard—even though the keyboard is on the bottom of the device. When the user wishes to enter text using the keyboard (referred to herein as "keyboard mode"), the Thumbboard-Mouse is flipped over in the hand holding it so that the thumb keyboard is facing up. The other hand is brought over so that both thumbs may be used to enter text on the thumb keyboard. The Thumbboard-Mouse is designed so that operation in keyboard mode will not allow inadvertent triggering of mouse buttons or the mouse positional sensing elements (i.e., pointing aspects). When the user wishes to again use the Thumbboard-Mouse as a computer mouse, the process is reversed: the second hand is moved away while the Thumbboard-Mouse is flipped over and operated as a mouse.

In contrast to traditional keyboards, the Thumbboard-Mouse works effectively when the user is not sitting at a desk, but rather sitting in a leisure chair or couch, or sitting on a subway train or airplane. The Thumbboard-Mouse works even when the user is standing up. The Thumbboard-Mouse is particularly effective in working with a detached screen display that is larger than any hand-held personal computing device. These qualities make it an effective input device for presentations or home theater installations.

The Thumbboard-Mouse can also be incorporated into other hand-held devices, such as clamshell-type cell phones. When the clamshell is closed, the device acts as a Thumbboard-Mouse to wirelessly control nearby detached screen displays (including those described in U.S. Pat. No. 7,058,356 (Slotznick), which is incorporated herein by reference), and can also be used to send email and text-messages via the built in cell phone capabilities. Even though smart cell phones have sufficient computing power for email and some other computing purposes, their form factor is such that many business people carry not only a cell phone, but also a Blackberry for email and a laptop for other computing. However, when the detached screen display is incorporated into a fashion accessory in accordance with U.S. Pat. No. 7,058,356, such as the side of a briefcase or handbag, then this fashion accessory along with a Thumbboard-Mouse (or Thumbboard-Mouse-enabled cell phone) together act as a fully functional personal computer.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings:

FIG. 5 shows a flowchart of the control circuit which turns the keyboard and mouse functions on and off in accordance with one preferred embodiment.

FIG. 6 shows an alternative embodiment of a flowchart of the control circuit which turns the keyboard and mouse functions on and off.

FIG. 8 shows yet an alternative embodiment of a flowchart of the control circuit which turns the keyboard and mouse functions on and off.

DETAILED DESCRIPTION OF THE INVENTION

Figure 1:
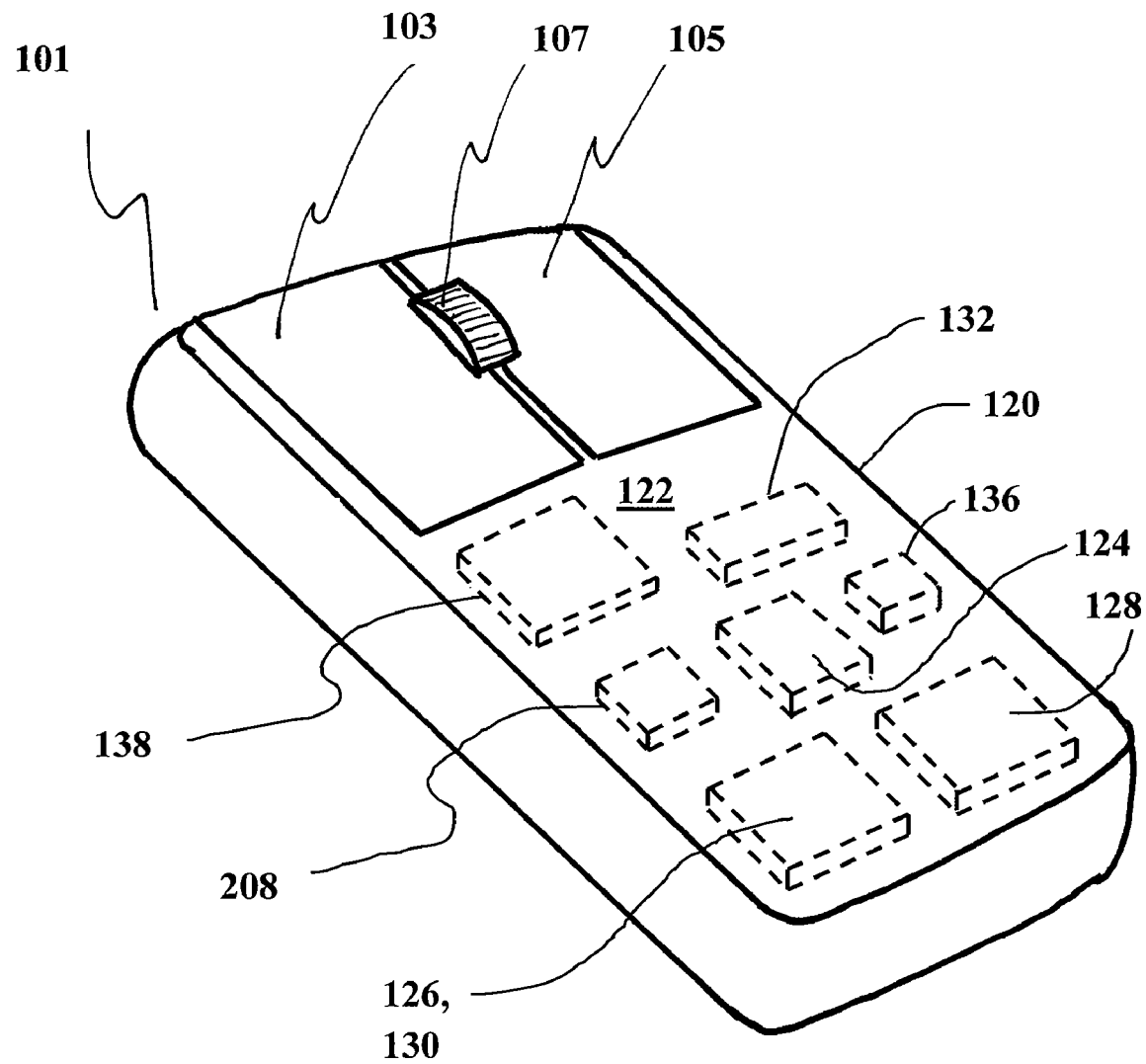
FIG. 1 shows a three-dimensional representation of a Thumbboard-Mouse in accordance with one preferred embodiment.

Certain terminology is used herein for convenience only and is not to be taken as a limitation on the present invention. In the drawings, the same reference numbers and letters are employed for designating the same elements throughout the several figures.

In one preferred embodiment, the Thumbboard-Mouse looks very much like one of the flatter cell phones. FIG. 1 shows an orthogonal 3-dimensional view of a preferred embodiment of Thumbboard-Mouse, interchangeably referred to herein as a "user interface device 101," in which the thumb keyboard is facing down. In this embodiment, the Thumbboard-Mouse is approximately 3.75 inches long, 2 inches wide and ⅝ inch thick. The mouse aspects of this embodiment feature two buttons (a left mouse button 103 and a right mouse button 105), as well as a scroll wheel 107. These features, 103, 105, and 107 are also shown in a view of the top of the Thumbboard-Mouse in FIG. 2A. Other embodiments may have more or fewer buttons, omit the scroll wheel or substitute a 360 degree scroll ball for the scroll wheel. FIG. 4A shows an embodiment with two buttons (103 and 105) and a 360 degree scroll ball, 307. The scroll ball acts as a mini-trackball when there is no flat surface on which the mouse can rest, or when there is not enough space to use a mouse. (See also FIG. 3A for an orthogonal view of FIG. 4A.)

The buttons 103 and 105 may be mechanical, electromechanical or virtual buttons defined on a touchscreen or touch-sensitive surface (e.g., a touchpad). The process of detecting when a virtual button defined on a touchscreen or touch-sensitive surface has been "pressed" is well-known in the prior art and thus is not described further.

Figure 2A:
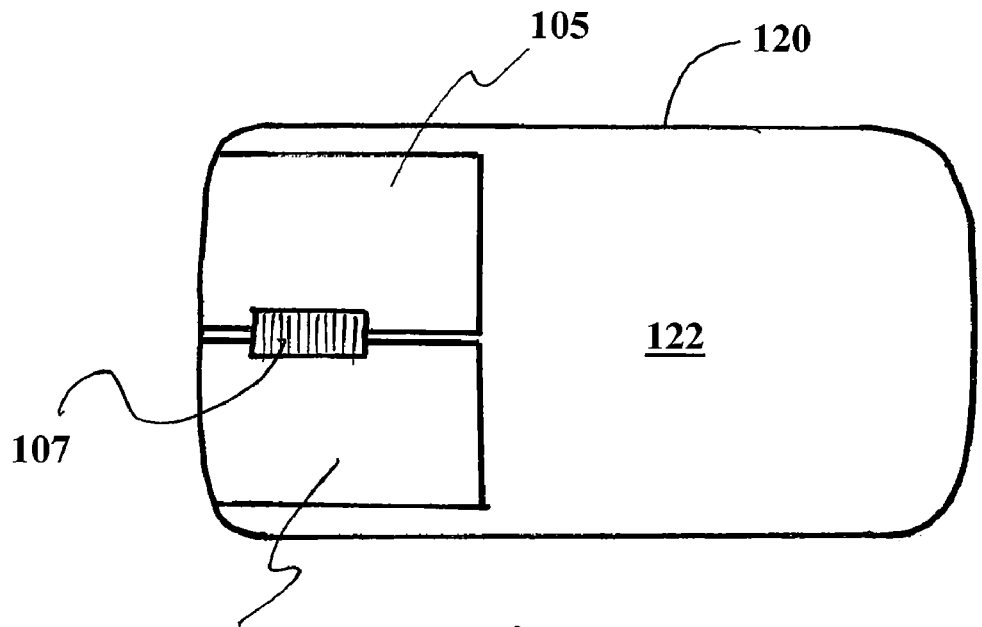
FIG. 2A shows the top of the Thumbboard-Mouse shown in FIG. 1 in accordance with one preferred embodiment.
Figure 2B:
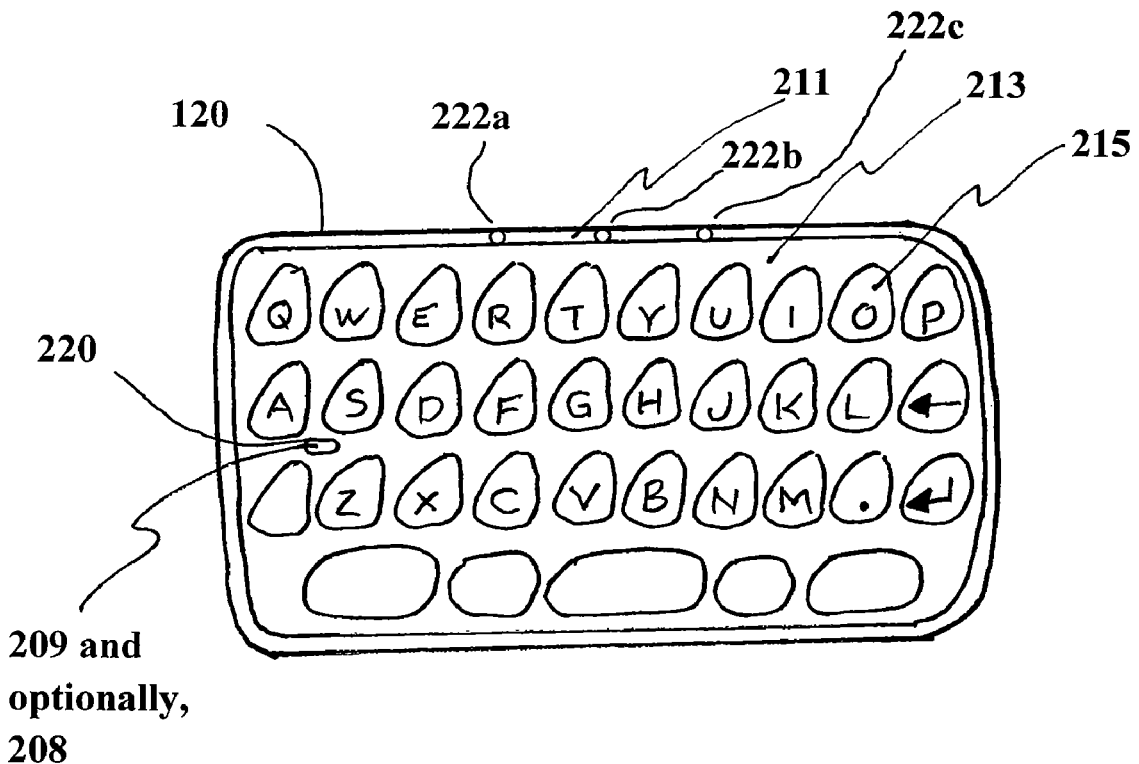
FIG. 2B shows the bottom of the Thumbboard-Mouse shown in FIG. 1 in accordance with one preferred embodiment.

Referring again to FIG. 1, the keyboard side of this preferred embodiment is shown in FIG. 2B. The base of the mouse, 213 is covered by a set of alpha-numeric keys, such as 215. In this embodiment, the keys are shown as individually constructed, though in other embodiments, they are part of a single membrane. This embodiment shows a QWERTY keyboard. However alternate embodiments use other alphanumeric keyboard layouts such as the DVORAK style. In the embodiment pictured in FIG. 2B, some of the unlabeled keys act as shift or function keys that allow the letter keys to serve for both lower and upper case letters as well as numbers and punctuation marks. Other embodiments have additional keys for numbers and symbols.

The edge of the keyboard side, 211, is raised higher than each key, 215 and the base, 213. This ensures that when the device is used as a mouse, and consequently the keyboard side is dragged along a flat surface, the keys will not be accidentally activated. In some embodiments this raised edge is not continuous. In this embodiment, the edge, 211, contains pressure sensors which indicate to the device whether the bottom of the Thumbboard-Mouse is resting or touching a flat surface. Other embodiments omit some or all of these pressure sensors. In particular, other embodiments may only have pressure sensors along the edge of the bottom nearest the number 211 (i.e., above the top row of letter keys: "QWERTYUIOP"). Alternative embodiments contain other types of proximity detectors.

The embodiment of the Thumbboard-Mouse shown in FIG. 1, FIG. 2A, and FIG. 2B acts as an optical mouse. In mouse-mode, the user places the keyboard side against a flat surface, and slides it over that surface. The light source and optical sensor that sense positional change are placed in a depression in the bottom (shown in FIG. 2B as 209). Other embodiments use other types of sensors for sensing change in position.

Figure 7:
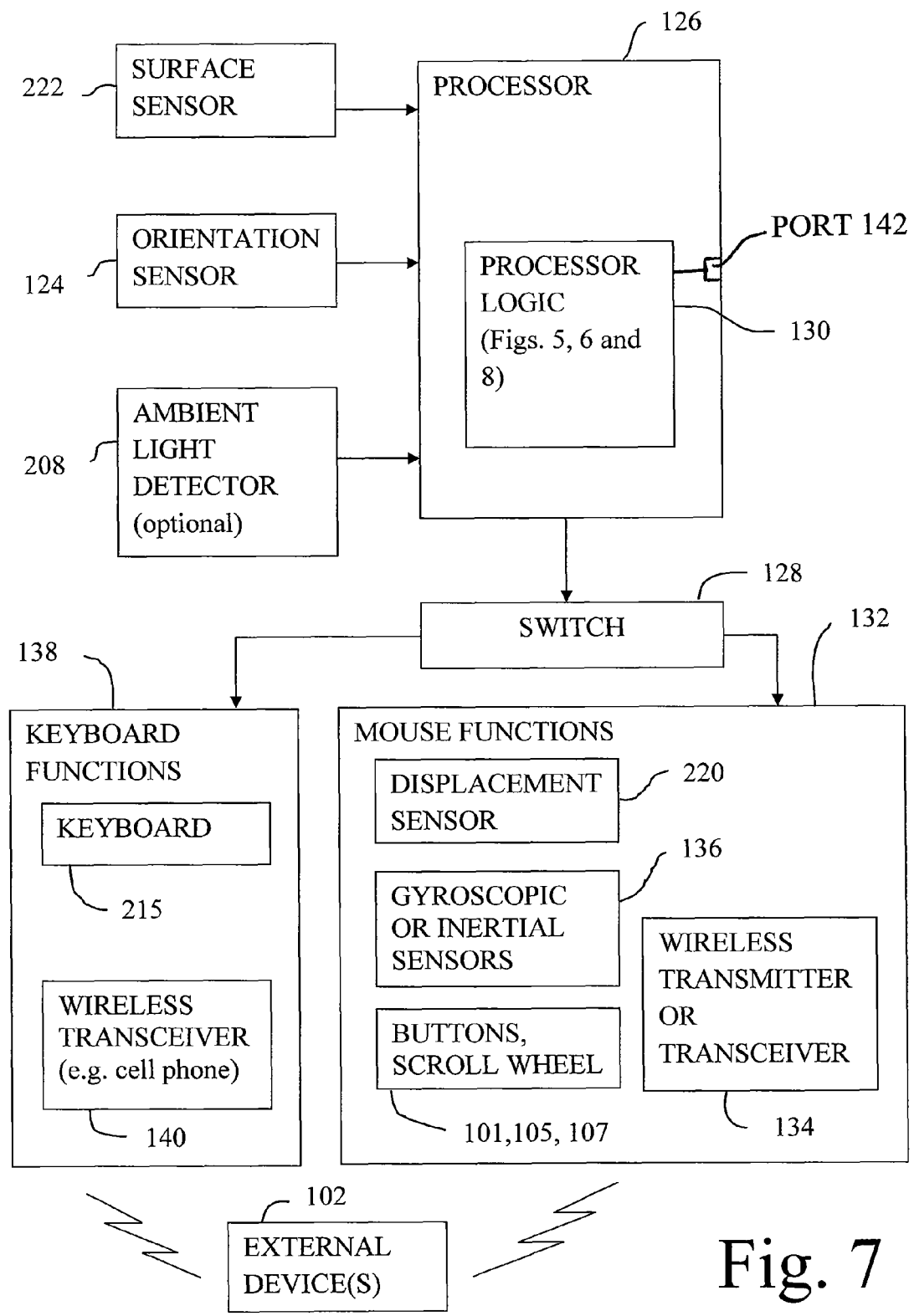
FIG. 7 shows a hardware diagram of the Thumbboard-Mouse-enabled cell phone in accordance with one preferred embodiment.

Referring again to FIGS. 1, 2A and 2B, the Thumbboard-Mouse, also referred to interchangeably as a user interface device 101, is used for controlling at least one external device 102 (in FIG. 7), such as the position (navigation) of a cursor on a display screen as a result of mouse movements, the triggering of an action as a result of pressing buttons 103 or 105, or the entry of text as a result of keyboard entries. Broadly speaking, the user interface device 101 has at least three operation modes, namely, a positional change operation mode wherein mouse functions are enabled (mouse-mode), a keyboard operation mode wherein the keyboard side is activated, and a mode where neither the mouse nor the keyboard is functional (that is, the functions of the thumbboard and the mouse are both turned off). In one preferred embodiment, the positional change operation mode and the keyboard operation mode operate in a mutually exclusive manner.

The user interface device 101 is defined by a main body portion 120 that includes a top surface 122 and a bottom surface 213, also referred to interchangeably as the base of the mouse 213. As discussed above, the top surface 122 includes at least one button 103 or 105 that is active only in the positional change operation mode. The bottom surface 213 shown in FIG. 2B includes a displacement sensor 220 that detects positional change of the user interface device 101 on a "touched" external surface only during the positional change operation mode. The displacement sensor 220 may be an optical or laser sensor, or a mechanical sensor as described below. All such sensors 220 are well-known in the prior art and thus are not described in further detail. (Element 209 refers to the depression where the active elements of the displacement sensor 220 interact with an external surface.) The bottom surface 213 also includes a thumb keyboard defined by the set of keys shown in FIG. 2B, such as key 215. The keys are preferably alphanumeric. In one preferred embodiment, the bottom surface is substantially planar in a manner similar to most mouse devices.

The user interface device 101 further includes an orientation sensor 124 that detects the orientation state of the device 101. The orientation sensor 124 is preferably embedded into the device 101 to protect it from damage as shown in phantom in FIG. 1. Various types of orientation sensors were described above, and any of the described sensors are suitable for use as the orientation sensor 124. Thus, the details of the orientation sensor 124 are not described any further.

The user interface device 101 further includes a surface sensor 222 that detects whether the bottom surface 213 of the user interface device 101 is "touching" an external surface. Various embodiments of the surface sensor are described below. In one preferred embodiment, the surface sensor is formed by the combination of pressure sensors 222a, 222b and 222c (shown in an enlarged view) on the portion of the raised edge 211 that is above the top row of letters ("QWERTYUIOP") and in the center third of that edge. The pressure sensors are preferably embedded within the raised edge 211 so that they do not alter the plane formed by the raised edge 211. Alternatively, the surface sensor may be any type of well-known proximity detection device and may be mounted on portions of the bottom surface 213, instead of the raised edge 211.

Figure 2C:
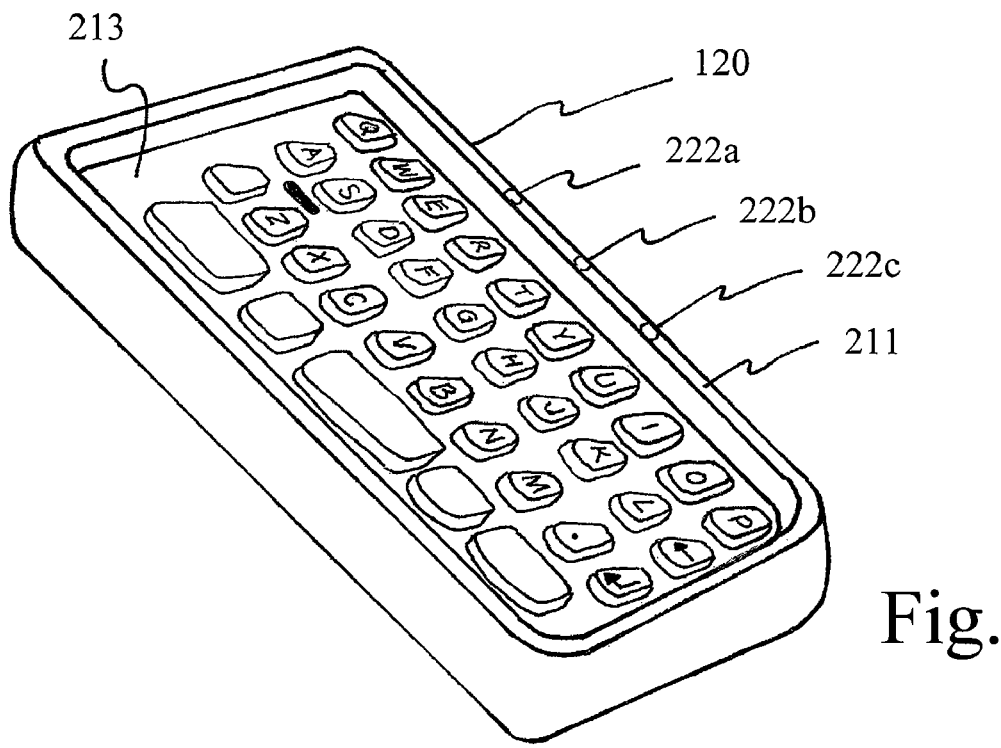
FIG. 2C shows a three-dimensional representation of FIG. 2B.

In the embodiment of the user interface device 101 shown in FIG. 2B wherein the bottom surface 213 includes a raised edge 211 around at least a portion of its periphery, the thumb keyboard becomes recessed so that when the device 101 is moved along a touched external surface, the thumb keyboard is not in contact with the touched external surface. FIG. 2C shows a three-dimensional view of FIG. 2B that better illustrates this result.

Figure 2D:
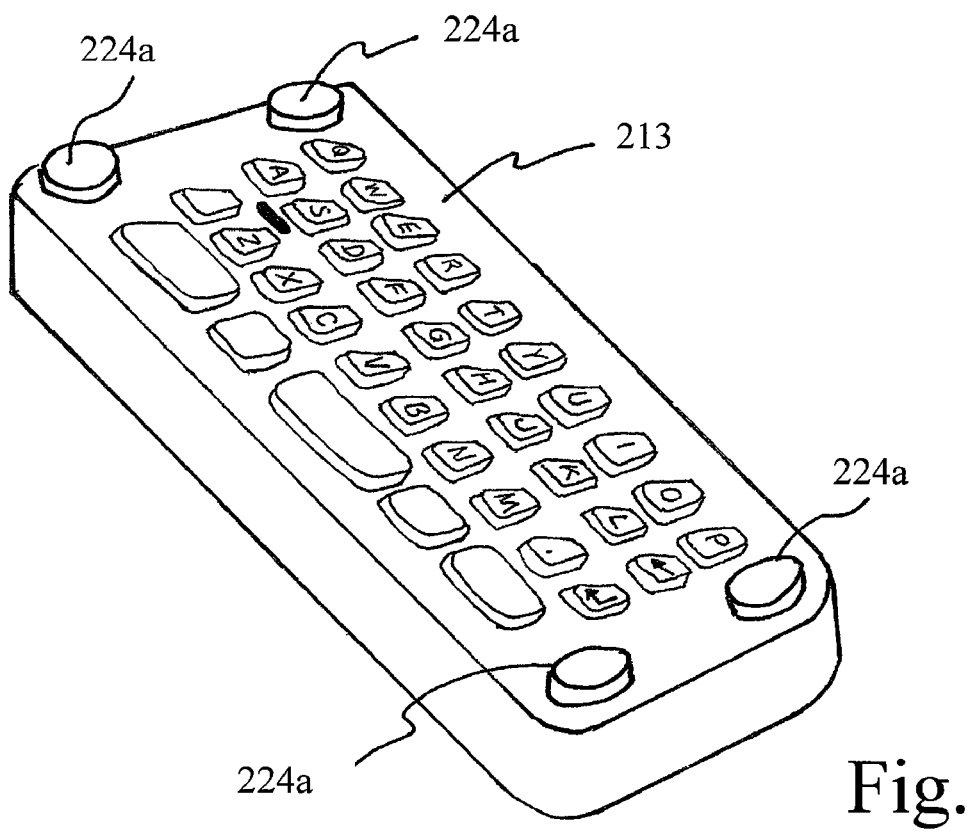
FIG. 2D shows a three-dimensional representation of an alternative embodiment of the bottom of the Thumbboard-Mouse shown in FIG. 1 having raised pads.
Figure 2E:
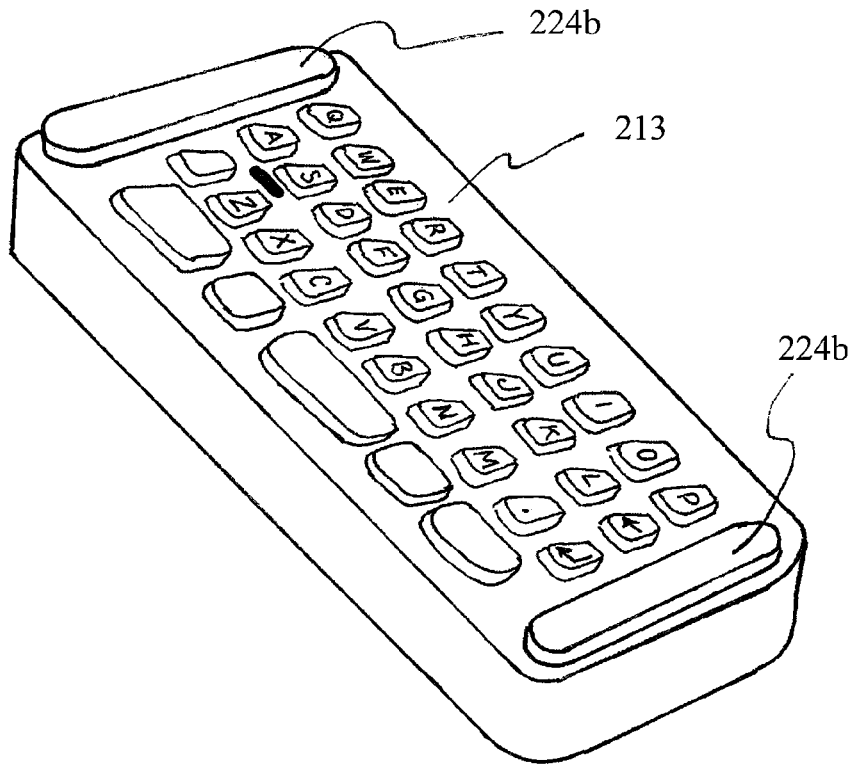
FIG. 2E shows a three-dimensional representation of another alternative embodiment of the bottom of the Thumbboard-Mouse shown in FIG. 1 having raised pads.

FIG. 2D and FIG. 2E show alternative embodiments of the bottom surface 213 wherein a plurality of slightly raised pads 224 extend from the bottom surface 213 further than the keys of the thumb keyboard. FIG. 2G shows a side view of the embodiments shown in FIG. 2D and FIG. 2E, when either of those embodiments is placed on a flat surface 226 such as a desk or table top, with the bottom facing towards that flat surface. This would be the position/orientation of the user interface device 101 if the user wished to use it as a mouse (i.e. in mouse-mode). Neither the bottom surface 213 of the device, nor any button 215 on the thumb keyboard touches the table or desk 226. The plurality of pads 224 (224a in FIG. 2D and 224b in FIG. 2E) ensure that when the device is moved along a touched external surface 226, the thumb keyboard is not in contact with the touched external surface, or is not in any significant contact with the touched external surface. This not only reduces the possibility of accidental pressing of keys, but also reduces the wear on them. In FIG. 2D, the pads are placed at the four corners of the bottom surface 213. In FIG. 2E, the pads are placed along the front and rear surfaces of the bottom surface 213. Both configurations are well-known in the prior art of optical mice.

Figure 2F:
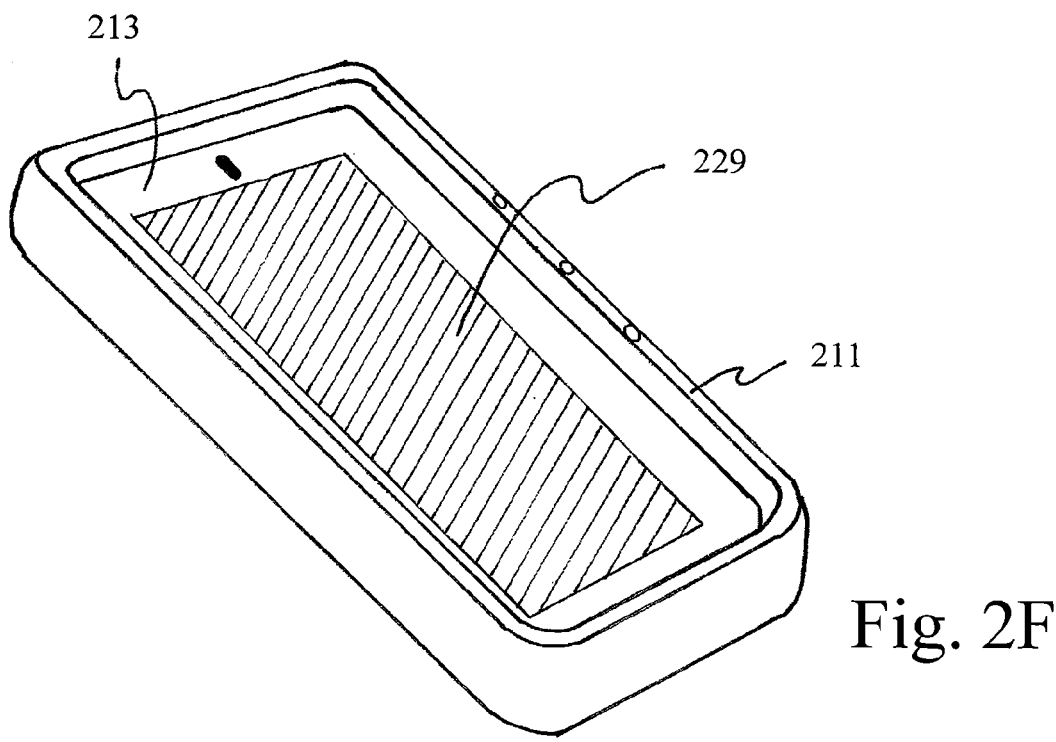
FIG. 2F shows a bottom surface of a Thumbboard-Mouse having a touchscreen in accordance with one preferred embodiment.
Figure 2G:
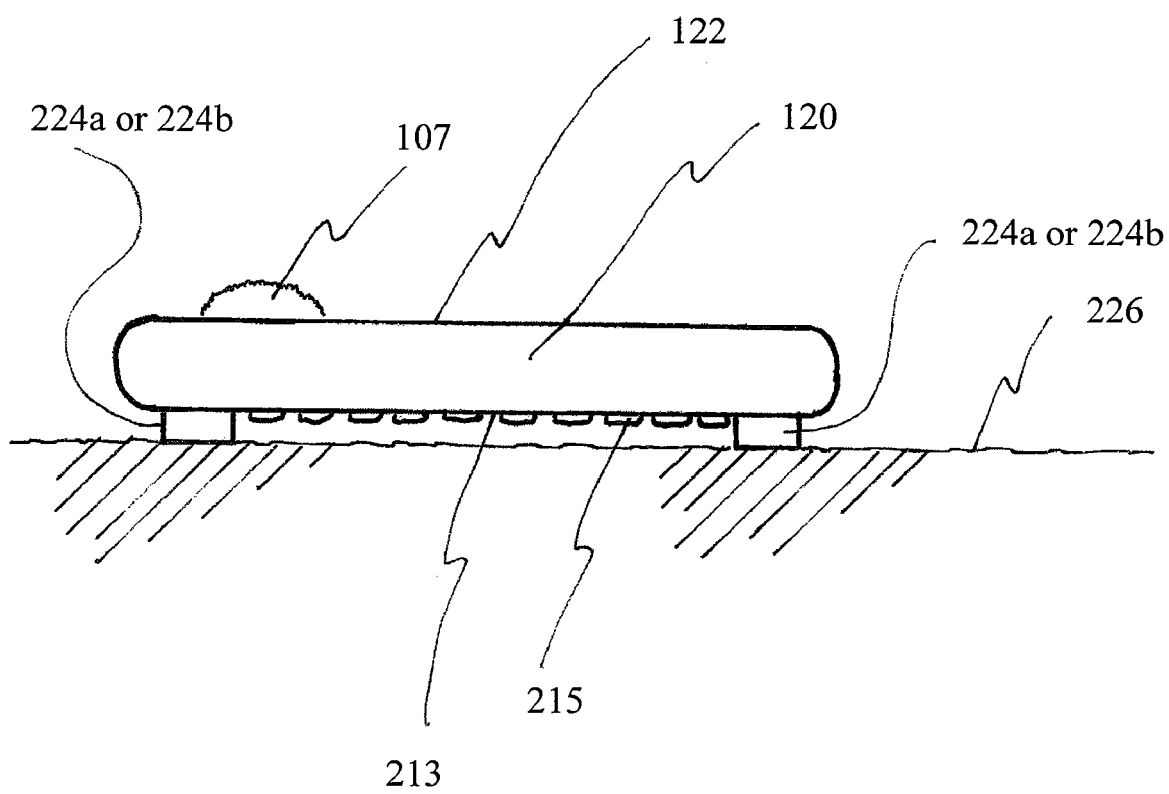
FIG. 2G shows a side view of the Thumbboard-Mouse shown in FIG. 2D and FIG. 2E, when it is placed on a flat surface such as a table top, with the bottom facing towards the flat surface.

FIG. 2F shows an alternative embodiment of the bottom surface 213 wherein the thumb keyboard is a touchscreen 229 that displays a virtual thumb keyboard. FIG. 2F shows the touchscreen in an inactive state (screen in blank). In an active state, the screen appears the same as shown in FIG. 2B, except in a virtual view. This embodiment may be constructed with either the raised edge 211, raised pads 224, or with no raised edges or pads. The raised edges or pads also function to protect the touchscreen from smudges and physical damage that might result from dragging it over a surface. In the embodiment with no raised edges or pads, the touchscreen display cover may be specially constructed to minimize smudges and withstand physical damage, while being smooth enough to allow for ease of use as a mouse surface.

The user interface device 101 further includes a processor 126 and a switch 128. These elements are also preferably embedded into the device 101 to protect them from damage as shown in phantom in FIG. 1. The processor 126 has processor logic 130 that receives input signals from at least the orientation sensor 124 and the surface sensor 222, and uses the input signals to determine whether to place the user interface device 101 in either the positional change operation mode or the keyboard operation mode. The switch 128 is configured to place the user interface device in either the positional change operation mode or the keyboard operation mode, or in neither mode.

In use, the processor logic 130 is programmed to place the user interface device 101 in the positional change operation mode when the orientation sensor 124 detects that the bottom surface 213 is not oriented in an upwards direction and the top surface 122 is oriented in an upwards direction, and the surface sensor 222 detects that the bottom surface 213 is touching an external surface. Furthermore, the processor logic 130 is programmed to place the user interface device 101 in the keyboard operation mode when the orientation sensor 124 detects that the bottom surface 213 is oriented in an upwards direction, and the surface sensor 222 detects that the bottom surface 213 is not touching an external surface.

Detecting that the bottom surface 213 is not oriented in an upwards direction and the top surface 122 is oriented in an upwards direction may be the result of a single detection signal, or multiple detection signals. For example, in some instances it may be inferred that the bottom surface 213 is not oriented in an upwards direction if it is detected that the top surface 122 is oriented in an upwards direction. However, in many instances this inference cannot be made. For example, if the user interface device is positioned vertically (e.g., placed in the breast-pocket of a shirt, placed in certain types of battery chargers, held up to one's ear if embodied in a cell phone), the orientation sensor(s) indicate(s) that the bottom surface is not oriented upwards AND that the top surface is not oriented upward. That is why the sensors must in some embodiments answer both orientation questions separately. In such a case, both the keyboard functions and the mouse functions will be turned off, not only to prevent input from being accidentally generated, but also to conserve battery life. This will be more fully described in the discussion of FIG. 5 and FIG. 6.

The user interface device 101 also includes conventional mouse functions 132 (e.g., displacement sensor 220, buttons 101 and 105, scroll wheel 107, wireless transmitter or transceiver 134, and gyroscopic or inertial sensors 136 if the optional air mouse functionality is provided). The user interface device 101 also includes keyboard functions 138 (e.g., keyboard (keys 215)) connected to a wireless transmitter or a wireless transceiver 140. In one embodiment, the mouse functions and keyboard functions share the same wireless transmitter or transceiver. In another embodiment, the mouse functions and keyboard functions use different wireless transmitters or transceivers. For example, in the Thumbboard-Mouse-enabled cell phone embodiment of FIGS. 3A and 3B, the wireless transceiver associated with the keyboard functions is the cell phone circuitry of the cell phone built into the user interface device 101. In this embodiment, the keyboard signals are sent to the external device(s) via the cell phone.

If the air mouse functionality is provided, the gyroscopic or inertial sensors 136 detect positional change of the user interface device 101. The positional change is used for navigation on a display screen of the external device(s) when the user interface device 101 is in the positional change operation mode and the bottom surface 213 is not in contact with a touched external surface. The processor logic 130 is configured to control the switch 128 to turn off the displacement sensor 220 when the gyroscopic or inertial sensors 136 are active.

Figure 3A:
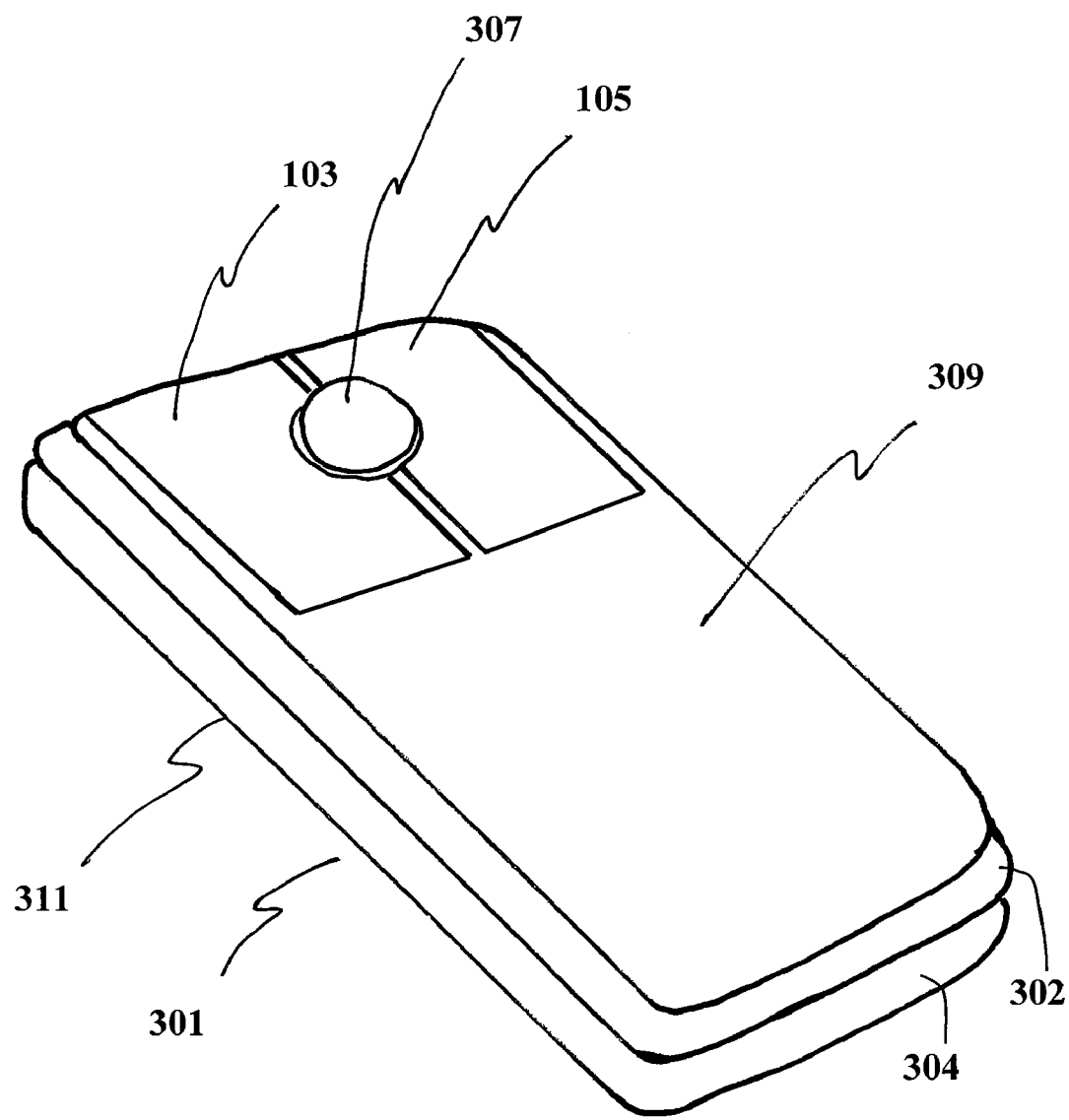
FIG. 3A shows a three-dimensional representation of a Thumbboard-Mouse-enabled cell phone with the cell phone in a closed position.
Figure 3B:
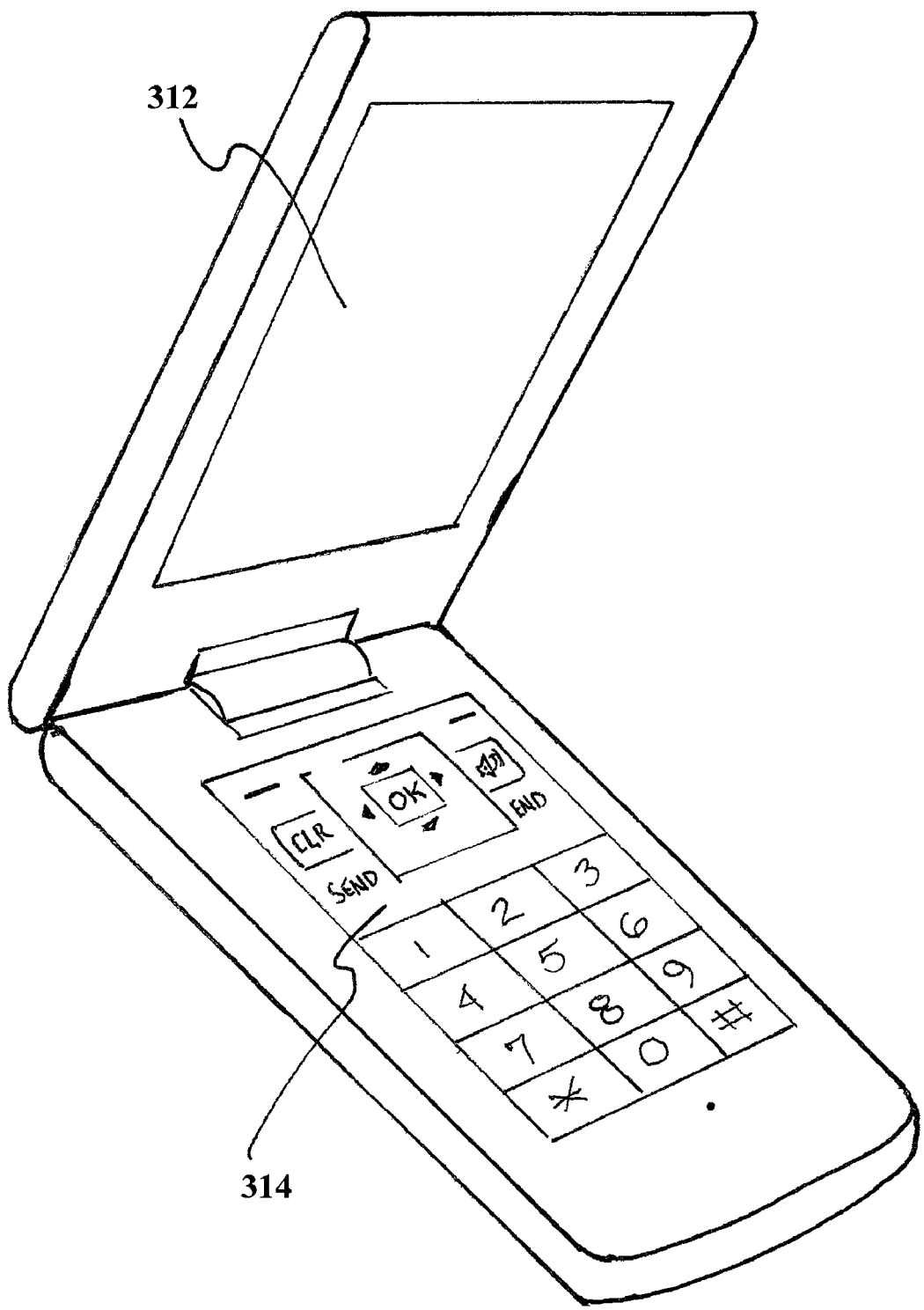
FIG. 3B shows the cell phone of FIG. 3A in an opened position.
Figure 4A:
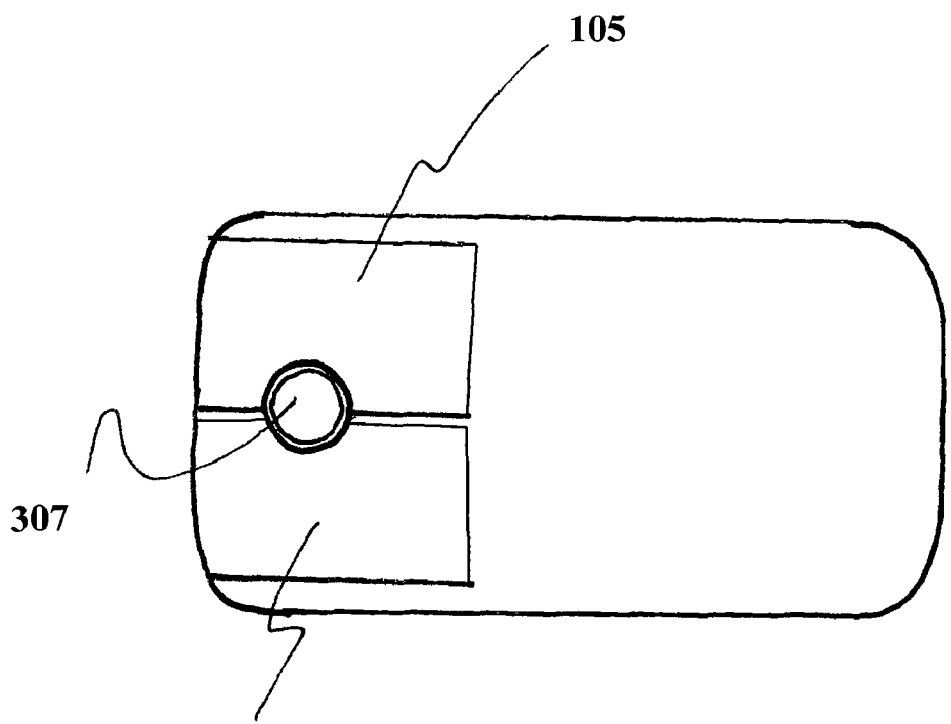
FIG. 4A shows the top of the Thumbboard-Mouse-enabled cell phone shown in FIG. 3A.

In the Thumbboard-Mouse-enabled cell phone embodiment of FIGS. 3A and 3B, the cell phone 301 has a clamshell configuration defined by an upper half 302 and a lower half 304. An outer surface of the upper half is the top surface of the device (top 309), an outer surface of the lower half is the bottom surface of the device (bottom 311), and inner surfaces of the upper and lower halves (312, 314 shown in FIG. 3B) include a cell phone keypad and a display screen for use in making and receiving phone calls.

In some embodiments, an ambient light sensor 208 is also embedded in 209. In other embodiments the ambient light sensor is elsewhere on the body of the device.

In this embodiment, when the user is editing text and wants to move the computer cursor to a particular letter or word, the device is in mouse mode. Then, the combination of a light source and optical sensor in 209 can sense positional change. In an alternate embodiment, the keyboard side includes a small track ball (or 360 degree scroll ball), which is used to move the computer cursor when the user is entering text and the device is in keyboard mode (see 403 in FIG. 4B.) In another alternate embodiment (not illustrated), the keyboard includes directional navigation keys (e.g., up, down, left and right) to control the cursor.

A well-trained touch-typist seldom looks at the keyboard, regardless of whether copying text or composing from scratch. However, less well-trained keyboarders often move their gaze to the keyboard and to the computer screen where the entered text appears. This alternating focus reduces speed and accuracy of text entry. An alternative embodiment of the Thumbboard-Mouse embeds a small LCD screen above the keyboard (see 401, in FIG. 4B). This should help a moderately skilled person who is entering text from scratch to keep his or her eyes focused down on the keyboard.

As described above and pictured in the figures, the Thumbboard-Mouse has two modes (the mouse mode and the keyboard mode) with different sets of controls. When the user is accessing one set of controls, it is important not only that those controls will take user input (in other words, be "turned on"), but that the other set of controls will not take input (in other words, be "turned off"). FIG. 5 is a flowchart that shows how the control circuit and sensors that are built into the Thumbboard-Mouse turn the keyboard controls and mouse controls on and off. In a preferred embodiment, FIG. 5 describes a control circuit that is activated when any of the device's sensors perceive a change in status. In alternate embodiments FIG. 5 describes a control circuit that loops from start (501) to finish (523) many times a second, assessing the state of the sensors. In an alternative embodiment, all control and sensor signals are sent from the Thumbboard-Mouse to the computer (or other peripheral) and the control circuit in FIG. 5 is used by the computer to decide which signals to treat as valid and which to ignore. (The control circuit without limitation, consists of hardware, software, or a combination thereof, and parts of the circuit may be located on different devices near or remote from the Thumbboard-Mouse.)

In a preferred embodiment, when one of the device's sensors perceives a change of status, the control circuit in FIG. 5, begins at Start, 501, and queries the appropriate sensor(s) as to whether the keyboard side is "up", 503. In this preferred embodiment, the initial sensor to be queried is a clinometer or accelerometer (or set of them) that senses the tilt and position of the device in relationship to gravity.

For purposes of this discussion, the word "horizontal" refers to a plane that can be generated (at any place near earth) that is perpendicular to the force of gravity at that place.

In this preferred embodiment, "up" means that a vector proceeding perpendicular from the surface of the Thumbboard-Mouse points above the horizontal. In alternate embodiments, "up" may be limited to when the vector points vertically (directly opposite to gravity) or within a limited number of degrees of vertical. In alternate embodiments, "up" may be limited to a specific range of possible three-dimensional orientations of the device.

If the keyboard side is "up" as determined in 503, the control circuit then queries the appropriate sensor(s) as to whether the keyboard side is "touching" a surface, 505. In a preferred embodiment, this sensor (or set of sensors) is a pressure sensor (or set of pressure sensors) on the raised edge of the bottom 211. In other embodiments other or various proximity detectors are employed.

In this preferred embodiment, "touching" means that all or most of the keyboard side is against some surface or surfaces, and distinguishes this from the situation where part of the keyboard side is touched when the user holds the device or activates individual keys or controls on the keyboard. Consequently, in this preferred embodiment, the sensors are pressure sensors on the portion of the raised edge 211 that is above the top row of letters ("QWERTYUIOP") and in the center third of that edge. This part of the edge is not touched as the individual holds or activates controls on the keyboard. To be clear, an "external surface" or "surfaces" discussed herein do not include a user's fingers or other parts of the user's hands. Thus, the surface sensors 222 used herein must be designed so that detection of a user's fingers or other parts of the user's hands do not cause a signal to be generated indicating that the device 101 is touching a surface.

If the keyboard side is not (for the most part) "touching" a surface 505, the device is in a position where the user can enter alphanumeric data on the keyboard, so the control circuit turns on the keyboard functions, 507, turns off the mouse functions, 509, and stops, 523.

On the other hand, if the keyboard side is mostly "touching" a surface, it indicates that an object is laying on top of the Thumbboard-Mouse, or that the user is grasping the Thumbboard-Mouse in a closed first, or that the user has put the Thumbboard-Mouse in his pocket or her purse, or that some situation exists in which the Thumbboard-Mouse cannot be effectively used as a keyboard. Consequently, if the answer to 505 is "yes", then the control circuit turns off mouse functions, 519, and also turns off keyboard functions, 521. Then the control circuit stops, 523.

Returning now to step 503 of the flowchart: if the keyboard side is not "up", 505, the control circuit queries the same (or similar) sensors as to whether the mouse side is "up", 511. In a preferred embodiment, the mouse mode works on a horizontal surface or surface with a small incline, but is not intended or expected to work on a near vertical surface. At the same time the keyboard is expected to be held in a horizontal or near horizontal position, rather than a vertical position.

This means that there are many orientations in which neither mouse-mode nor keyboard-mode are expected to be operable. Consider for example, when the device is placed in a shirt pocket. In any event, if neither the keyboard side (503) nor the mouse side (511) are "up", the answer to 511 is "no", the device is not in a position to be used as either a mouse or a keyboard, and the control circuit turns off mouse functions, 519, turns off keyboard functions, 521, and stops, 523.

On the other hand, if the answer to 511 is "yes", the control circuit queries the sensor(s) whether keyboard is mostly "touching" a surface, 513. If so, the Thumbboard-Mouse is resting on a surface and ready for the user to use it as a mouse. Consequently, if the answer to 513 is "yes", then the control circuit turns on the mouse functions, 515, turns off the keyboard functions, 517, and then stops, 523.

If the answer to 511 is "no", then the device is not in a position where it is expected to be operable, so the control circuit turns off the mouse functions, 519, turns off the keyboard functions, 521, and then stops, 523.

In an alternate embodiment, ambient light sensors (or proximity detectors) are added to enable the control circuit to turn the device off if it is put in a purse or pocket or desk drawer. In such an embodiment, after the start, 501, the control circuit first queries these sensors if there is enough ambient light to indicate that the device is not in a purse, pocket, drawer, briefcase, or other such space. If the answer is that there is sufficient ambient light, the control circuit proceeds to 503. Otherwise, if there is insufficient light, the control circuit turns off mouse functions, 519, turns off keyboard functions, 521, and stops, 523.

In an alternate embodiment of the Thumbboard-Mouse, an on/off switch is substituted for the ambient light sensor. This embodiment is particularly useful where the device is designed to operate in dark environments, such as a darkened passenger cabin in an airplane.

In an alternative embodiment, the Thumbboard-Mouse incorporates gyroscopic or inertial sensors in mouse mode as position sensing elements in addition to optical or mechanical sensors. In this embodiment, the Thumbboard-Mouse does not have to rest on a flat surface for mouse mode. Instead, moving the Thumbboard-Mouse through the air will direct the computer cursor. This embodiment requires the following changes to FIG. 5. Step 509 and 519 become "Turn off all mouse functions". Step 515 becomes "Turn on optical mouse sensors and optical mouse functions". A new step 516 labeled "Turn off air mouse inertial sensors and functions" is inserted between steps 515 and 517. In this embodiment, two new steps are inserted if the answer to 513 is "no", as a substitute for 519 ("Turn off all mouse functions"). The first step 525 is labeled "Turn on air mouse inertial sensors and functions", which leads to the second step 527 labeled "Turn off optical mouse sensors and optical mouse functions". After 527, the control circuit by-passes 519 and rejoins the flowchart at 521, "Turn off keyboard functions", then proceeds to Stop 523. FIG. 6 shows the flowchart for this alternative embodiment.

In yet another alternative embodiment, the Thumbboard-Mouse incorporates gyroscopic or inertial sensors in mouse mode but foregoes optical or mechanical sensors. That is, the gyroscopic or inertial sensors are used as the position sensing elements whenever the Thumbboard-Mouse is in the mouse mode and resting on a flat surface or in the mouse mode and moving through the air. Accordingly, no surface sensor 222 is needed in this embodiment since there is no need to detect whether the bottom surface of the Thumbboard-Mouse is touching an external surface. FIG. 8 shows an example of processor logic for implementing this embodiment. The logic is self-explanatory in view of the descriptions given in FIGS. 5 and 6.

Structurally, this embodiment of the Thumbboard-Mouse may look like any of the previously shown figures, except that there is no displacement sensor 220. There is also no requirement of a surface sensor 222, except that a surface sensor 222 could be included to provide added functionality.

Thus far, the Thumbboard-Mouse has been described as being embodied in a stand-alone input device for a computer. However, the Thumbboard-Mouse as so described is similar in size as many cell phones, such as the LG VX8700. This camera phone opens like a clamshell to reveal the phone pad and screen inside. Its outside has a camera lens on one side along a smaller screen primarily for system information, like time, date, signal strength and battery life, but can be used in the LG VX8700 to help the user focus the camera features to take a picture of himself or herself. Otherwise the outside surface of the VX8700 is blank.

In an alternate embodiment of the Thumbboard-Mouse, it is incorporated into the outside of a cell phone such as the VX8700. FIG. 3A shows an orthogonal view of the top of such a cell phone 301. This looks very much like the embodiment illustrated in FIG. 1, except a line along the sides indicates how the top of the cell phone, 309, separates from the bottom, 311, when the cell phone is opened to make or take a phone call. In this embodiment, the top, 309, contains two buttons (a left button, 103, and a right button, 105) as well as a 360 degree scroll ball, 307. FIG. 4A shows a non-orthogonal view of the top of the same cell phone. Other embodiments that incorporate the Thumbboard-Mouse into a cell phone have more or fewer buttons, substitute a scroll wheel for the scroll ball, or omit both scroll wheel and scroll ball.

Figure 4B:
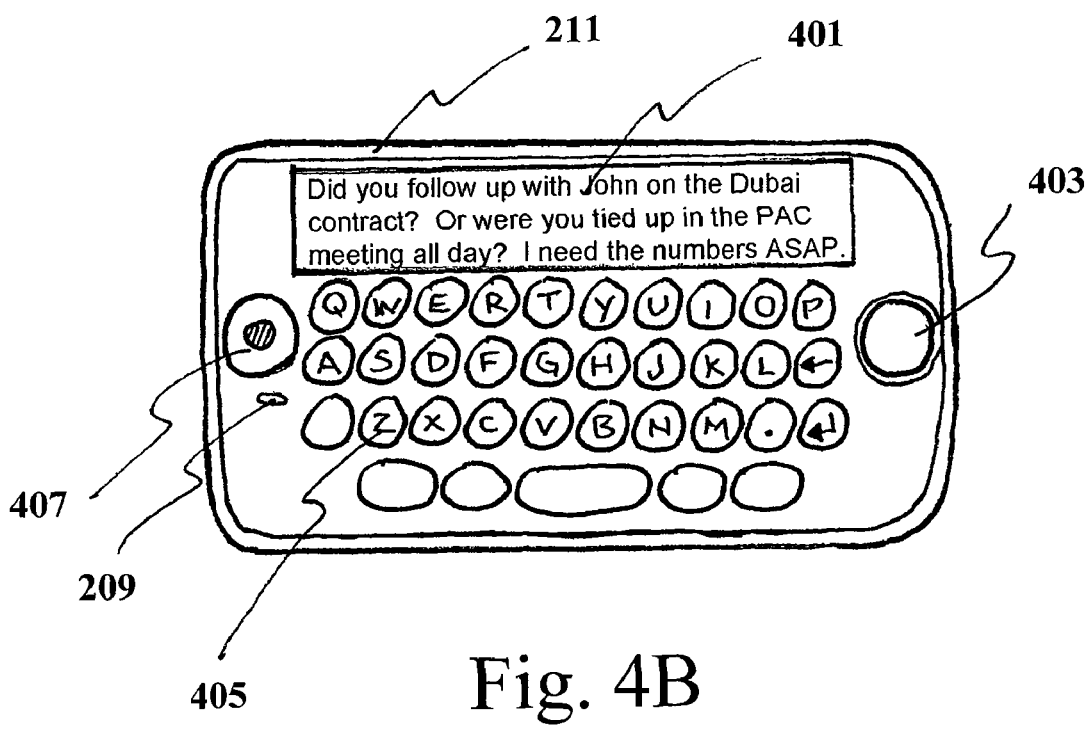
FIG. 4B shows the bottom of the Thumbboard-Mouse-enabled cell phone shown in FIG. 3A.

FIG. 4B shows the bottom of this embodiment. The mini-QWERTY keyboard is smaller than the embodiment shown in FIG. 2B, but still about the same size as the keyboard of a BlackBerry. A typical key is shown as 405. The bottom also includes the indentation, 209, that contains a light source and optical sensor for use in mouse-mode, as well as the raised edge, 211, with pressure sensors. This embodiment also includes a mini-track ball, 403, as well as a lens for the camera phone, 407, and a small screen, 401, to display text being entered. This screen is large enough to display an entire SMS text message (which is limited by the standard practice of communications carriers to 160 characters). In some embodiments, this screen (401) also displays the most recent SMS text message received by the cell phone.

Alternate embodiments omit the mini-track ball (403), camera lens (407), or screen (401). Alternate embodiments may have a discontinuous raised edge (211) as well. Other alternate embodiments have a different number, position, orientation or layout of alphanumeric keys, or navigation keys on the bottom, or a different position of the optical sensors (209). Alternative embodiments include gyroscopic or inertial sensors in addition to (or instead of) optical or mechanical position sensors.

In all of these embodiments, the mouse mode and keyboard mode are turned off when the clamshell is opened and the user is using the device as a cell phone. In a preferred embodiment, when the clamshell is closed and the device is not wirelessly connected with a nearby computer or other peripheral, the keyboard (FIG. 4B) mode is used to read and enter SMS text messages that are sent and received by the cell phone. In a preferred embodiment, when the device is wirelessly connected to a nearby computer, the user chooses whether the Thumbboard-Mouse sends data to the computer (for text entry and cursor control) or the cell phone (for SMS text messaging). The user makes this choice by switch, keystroke, or series of keystroke. In this manner, the user can alternate between using the Thumbboard-Mouse to send text messages via the cell phone and using it to control the nearby computer.

In an alternate embodiment, the cell phone does all the computing and just sends instructions for data display to a nearby monitor, TV screen, or computer as described in U.S. Pat. No. 7,058,356. In this embodiment, the Thumbboard-Mouse is sending alphanumeric and positional data to the computer embedded in the phone via wire, optical fiber or other circuitry rather than wirelessly. It is the computer in the cell phone that is communicating wirelessly with a nearby monitor or computer. However, the user experience will be similar to that of the previously described embodiments.

In an alternate embodiment, the Thumbboard-Mouse connects wirelessly to a number of nearby devices such as computers and cell phones. For example, the Thumbboard-Mouse connects to the user's laptop on a desk, a cell phone in the user's pocket, and a large screen TV monitor (controlled by a different computer) in the front of the room. In this embodiment, the user selects which device receives the alphanumeric and positional input from the Thumbboard-Mouse by using keystrokes on the keyboard. In an alternative embodiment, with a small LCD screen such as 401, the screen displays a list of the devices to which the Thumbboard-Mouse is wirelessly "paired" and the user selects from them using the keyboard.

Cell phone form factors other than a clamshell design are within the scope of the present invention.

In an alternative embodiment, a user interface device that is not initially programmed to function as a Thumbboard-Mouse is provided that has the following form factor:
1. Touchscreen on the bottom surface 213, such as shown in FIG. 2F.
2. Touch-sensitive surface (e.g., a touchpad) on the top surface 122, such as shown in FIG. 1, 2A, 3A or 4A, wherein the touch-sensitive surface is defined by virtual button regions 103 and/or 105, or other region(s) of the top surface 122.

Such a user interface device may initially have other functionality, such as a cell phone or a remote control device for a gaming machine, television or other type of audio-visual appliance. Accordingly, such a device may already include some or all of the elements shown in FIG. 7, except for the processor logic of FIG. 5, 6 or 8 that allows the user interface device to function as a Thumbboard-Mouse in any of the above-described embodiments. In this embodiment, a port 142 attached to the processor 126 allows a user to download the processor logic 130 so as to add Thumbboard-Mouse functionality to a device that otherwise cannot perform such functions. Alternatively, the user may download the processor logic 130 wirelessly using the existing wireless transceiver(s) 134 or 140. In this manner, the Thumbboard-Mouse becomes just another application that can be downloaded (typically, for a small fee) to an existing electronic device.

The processor logic 130 may be represented by software or hard-coded firmware. The processor 126 may be any general-purpose microprocessor or computer executing an operating system that is capable of running processor logic 130.

The present invention may be implemented with any combination of hardware and software. If implemented as a computer-implemented apparatus, the present invention is implemented using means for performing all of the steps and functions described above.

The processor logic 130 of the present invention can be included in an article of manufacture (e.g., one or more computer program products) having, for instance, a computer useable medium or computer useable media. The medium (media) is encoded with, for instance, computer readable program code means that, when executed, provides and facilitates the mechanisms of the present invention. The article of manufacture can be included as part of a computer system or sold separately.

Changes can be made to the embodiments described above without departing from the broad inventive concept thereof. The present invention is thus not limited to the particular embodiments disclosed, but is intended to cover modifications within the spirit and scope of the present invention.

What is claimed is:

1. A user interface device for use in controlling at least one external device, the user interface device having at least (i) a positional change operation mode, and (ii) a keyboard operation mode, the user interface device comprising:
  (a) a main body portion including:
    (i) a top surface including at least one button that is active only in the positional change operation mode, the at least one button triggering an action in the at least one external device when pressed, and
    (ii) a bottom surface including:
      (A) a displacement sensor that detects positional change of the user interface device only during the positional change operation mode, the positional change being used for navigation on a display screen of the at least one external device, and
      (B) a thumb keyboard having a plurality of keys that generate keyboard signals for sending to the at least one external device only when the user interface device is in the keyboard operation mode, the plurality of keys allowing for entry of at least alphabetic characters, wherein in the keyboard operation mode, the alphabetic characters of the keys when viewed upright are perpendicular to the orientation of the device when used in the positional change operation mode, so that when changing between the positional change operation mode and the keyboard operation mode, the user interface device must be turned over and rotated 90 degrees;
  (b) an orientation sensor that detects the orientation state of the user interface device;
  (c) a surface sensor that detects whether the bottom surface of the user interface device is touching an external surface;
  (d) a processor including processor logic that receives input signals from at least the orientation sensor and the surface sensor, and uses the input signals to determine whether to place the user interface device in either the positional change operation mode or the keyboard operation mode; and
  (e) a switch configured to place the user interface device in either the positional change operation mode or the keyboard operation mode.

2. The user interface device of claim 1 wherein the top surface includes two buttons.

3. The user interface device of claim 1 wherein the top surface includes a scroll wheel for use in scrolling a display associated with the at least one external device.

4. The user interface device of claim 1 wherein the displacement sensor is a scroll ball.

5. The user interface device of claim 1 wherein the displacement sensor is an optical sensor.

6. The user interface device of claim 1 wherein the displacement sensor detects positional change of the user interface device on a touched external surface.

7. The user interface device of claim 1 wherein the bottom surface is substantially planar.

8. The user interface device of claim 1 wherein the bottom surface includes a raised edge around at least a portion of its periphery, the thumb keyboard thereby being recessed so that when the device is moved along a touched external surface, the thumb keyboard is not in contact with the touched external surface.

9. The user interface device of claim 1 wherein the bottom surface includes a plurality of pads that extend from the bottom surface further than the keys of the thumb keyboard, the thumb keyboard thereby being recessed with respect to a plane formed by the plurality of pads so that when the device is moved along a touched external surface, the thumb keyboard is not in contact with the touched external surface, or is not in any significant contact with the touched external surface.

10. The user interface device of claim 1 wherein the thumb keyboard is a touchscreen that displays a virtual thumb keyboard.

11. The user interface device of claim 1 further comprising:
(f) gyroscopic or inertial sensors that detect positional change of the user interface device, the positional change being used for navigation on a display screen of the at least one external device when the user interface device is in the positional change operation mode and the bottom surface is not in contact with a touched external surface, the processor logic being further configured to control the switch to turn off the displacement sensor when the gyroscopic or inertial sensors are active.

12. The user interface device of claim 1 further comprising:
(f) a cell phone, wherein the keyboard signals are sent to the at least one external device via the cell phone.

13. The user interface device of claim 1 further comprising a cell phone having a clamshell configuration defined by an upper half and a lower half, an outer surface of the upper half being the top surface of the device, an outer surface of the lower half being the bottom surface of the device, and inner surfaces of the upper and lower halves including a cell phone keypad and a display screen for use in making and receiving phone calls.

14. The user interface device of claim 1 further comprising:
(f) a wireless transmitter, wherein the keyboard signals are sent to the at least one external device via the wireless transmitter.

15. The user interface device of claim 1 wherein the processor logic is programmed to place the user interface device in the positional change operation mode when:
(i) the orientation sensor detects that the bottom surface is not oriented in an upwards direction and the top surface is oriented in an upwards direction, and
(ii) the surface sensor detects that the bottom surface is touching an external surface.

16. The user interface device of claim 1 wherein the processor logic is programmed to place the user interface device in the keyboard operation mode when:
(i) the orientation sensor detects that the bottom surface is oriented in an upwards direction, and
(ii) the surface sensor detects that the bottom surface is not touching an external surface.

17. The user interface device of claim 1 wherein the bottom surface is configured to be used in a landscape configuration during the keyboard operation mode with the alphabetic characters of the keys viewed upright.

18. The user interface device of claim 17 wherein there are more keys along rows of the thumb keyboard than columns of the thumb keyboard when the alphabetic characters of the keys are viewed upright in the landscape configuration.

19. A user interface device for use in controlling at least one external device, the user interface device having at least (i) a positional change operation mode, and (ii) a keyboard operation mode, the user interface device comprising:
(a) a main body portion including:
(i) a top surface including at least one button that is active only in the positional change operation mode, the at least one button triggering an action in the at least one external device when pressed, and
(ii) a bottom surface including a thumb keyboard having a plurality of keys that generate keyboard signals for sending to the at least one external device only when the user interface device is in the keyboard operation mode, the plurality of keys allowing for entry of at least alphabetic characters, wherein in the keyboard operation mode, the alphabetic characters of the keys when viewed upright are perpendicular to the orientation of the device when used in the positional change operation mode, so that when changing between the positional change operation mode and the keyboard operation mode, the user interface device must be turned over and rotated 90 degrees;
(b) an orientation sensor that detects the orientation state of the user interface device;
(c) gyroscopic or inertial sensors that detect positional change of the user interface device, the positional change being used for navigation on a display screen of the at least one external device when the user interface device is in the positional change operation mode;
(d) a processor including processor logic that receives input signals from at least the orientation sensor, and uses the input signals to determine whether to place the user interface device in either the positional change operation mode or the keyboard operation mode; and
(e) a switch configured to place the user interface device in either the positional change operation mode or the keyboard operation mode.

20. The user interface device of claim 19 wherein the top surface includes two buttons.

21. The user interface device of claim 19 wherein the top surface includes a scroll wheel for use in scrolling a display associated with the at least one external device.

22. The user interface device of claim 19 wherein the thumb keyboard is a touchscreen that displays a virtual thumb keyboard.

23. The user interface device of claim 19 further comprising:
(f) a cell phone, wherein the keyboard signals are sent to the at least one external device via the cell phone.

24. The user interface device of claim 19 further comprising a cell phone having a clamshell configuration defined by an upper half and a lower half, an outer surface of the upper half being the top surface of the device, an outer surface of the lower half being the bottom surface of the device, and inner surfaces of the upper and lower halves including a cell phone keypad and a display screen for use in making and receiving phone calls.

25. The user interface device of claim 19 further comprising:
(f) a wireless transmitter, wherein the keyboard signals are sent to the at least one external device via the wireless transmitter.

26. The user interface device of claim 19 wherein the bottom surface is configured to be used in a landscape configuration during the keyboard operation mode with the alphabetic characters of the keys viewed upright.

27. The user interface device of claim 26 wherein there are more keys along rows of the thumb keyboard than columns of the thumb keyboard when the alphabetic characters of the keys are viewed upright in the landscape configuration.

28. A user interface device for use in controlling at least one external device, the user interface device having at least (i) a positional change operation mode, and (ii) a keyboard operation mode, the user interface device comprising:
(a) a main body portion including:
(i) a top surface including at least one button that is active only in the positional change operation mode, the at least one button triggering an action in the at least one external device when pressed, and
(ii) a bottom surface including:
(A) a displacement sensor that detects positional change of the user interface device only during the positional change operation mode, the positional change being used for navigation on a display screen of the at least one external device, and
(B) a thumb keyboard having a plurality of keys that generate keyboard signals for sending to the at least one external device only when the user interface device is in the keyboard operation mode, the plurality of keys allowing for entry of at least alphabetic characters, wherein the bottom surface is configured to be used in a landscape configuration during the keyboard operation mode with the alphabetic characters of the keys viewed upright;
(b) an orientation sensor that detects the orientation state of the user interface device;
(c) a surface sensor that detects whether the bottom surface of the user interface device is touching an external surface;
(d) a processor including processor logic that receives input signals from at least the orientation sensor and the surface sensor, and uses the input signals to determine whether to place the user interface device in either the positional change operation mode or the keyboard operation mode; and
(e) a switch configured to place the user interface device in either the positional change operation mode or the keyboard operation mode.

29. A user interface device for use in controlling at least one external device, the user interface device having at least (i) a positional change operation mode, and (ii) a keyboard operation mode, the user interface device comprising:
(a) a main body portion including:
(i) a top surface including at least one button that is active only in the positional change operation mode, the at least one button triggering an action in the at least one external device when pressed, and
(ii) a bottom surface including a thumb keyboard having a plurality of keys that generate keyboard signals for sending to the at least one external device only when the user interface device is in the keyboard operation mode, the plurality of keys allowing for entry of at least alphabetic characters, wherein the bottom surface is configured to be used in a landscape configuration during the keyboard operation mode with the alphabetic characters of the keys viewed upright;
(b) an orientation sensor that detects the orientation state of the user interface device;
(c) gyroscopic or inertial sensors that detect positional change of the user interface device, the positional change being used for navigation on a display screen of the at least one external device when the user interface device is in the positional change operation mode;
(d) a processor including processor logic that receives input signals from at least the orientation sensor, and uses the input signals to determine whether to place the user interface device in either the positional change operation mode or the keyboard operation mode; and
(e) a switch configured to place the user interface device in either the positional change operation mode or the keyboard operation mode.

* * * * *